United States Patent [19]

Belanger

[11] Patent Number: 5,031,364
[45] Date of Patent: Jul. 16, 1991

[54] FASTENER PINTAIL SHAVING TOOL

[75] Inventor: Victor Belanger, Huntington Beach, Calif.

[73] Assignee: Monogram Industries, Inc., Providence, R.I.

[21] Appl. No.: 329,989

[22] Filed: Mar. 29, 1989

[51] Int. Cl.$^5$ .................. B24B 23/00; B24B 27/08; B24B 55/06; B25F 3/00

[52] U.S. Cl. .................. 51/170 T; 51/168; 51/273; 30/133

[58] Field of Search .................. 30/133; 411/43, 500, 411/437; 51/170 PT, 170 T, 170 R, 168

[56] References Cited

U.S. PATENT DOCUMENTS

| | | |
|---|---|---|
| 3,643,544 | 2/1972 | Massa . |
| 3,805,456 | 4/1974 | Williams .................. 51/109 |
| 4,124,456 | 11/1978 | Levinson .................. 51/273 |
| 4,488,383 | 12/1984 | Zerbe .................. 51/170 T |
| 4,541,205 | 9/1985 | Patrello .................. 51/168 |
| 4,590,713 | 5/1986 | Yasch .................. 51/170 T |
| 4,616,449 | 10/1986 | Martoh .................. 51/170 R |
| 4,637,170 | 1/1987 | Block .................. 51/168 |
| 4,772,167 | 9/1988 | Beals . |

OTHER PUBLICATIONS

Brochure by Zephyr on Rivet Shavers, 10 Pages (Undated).

*Primary Examiner*—Douglas D. Watts
*Assistant Examiner*—Paul M. Heyrana
*Attorney, Agent, or Firm*—Pretty, Schroeder, Brueggemann & Clark

[57] ABSTRACT

A cutting tool is provided for removing the exposed pintail of a set fastener, such as blind fastener of the type commonly used in the aerospace industry. The tool comprises an air motor for rapidly rotating a relatively thin cutting disk made from a highly abrasive material. The tool is provided with an adjustment mechanism to control the distance of the cutting disk with respect to the surface in which the fastener is set. In operation, the cutting disk rapidly cuts through and removes the pintail so that it is substantially flush with the surrounding surface. A vacuum system also is provided inside the tool for collecting the severed pintails and related debris that results from the pintail cutting process.

22 Claims, 3 Drawing Sheets

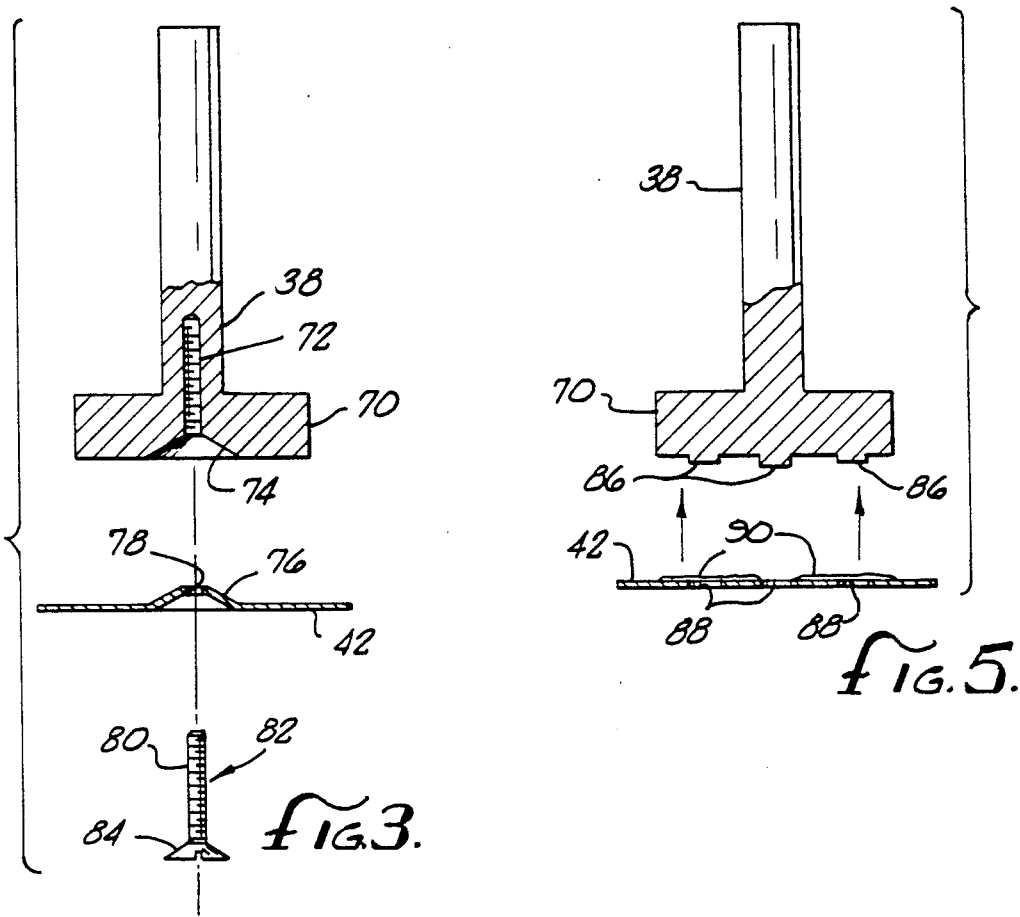
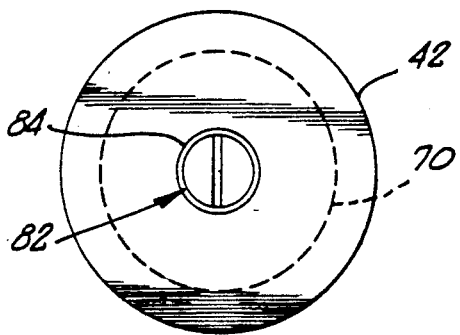
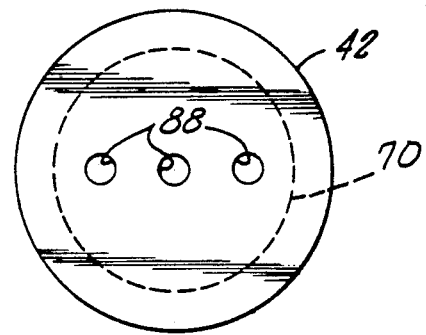

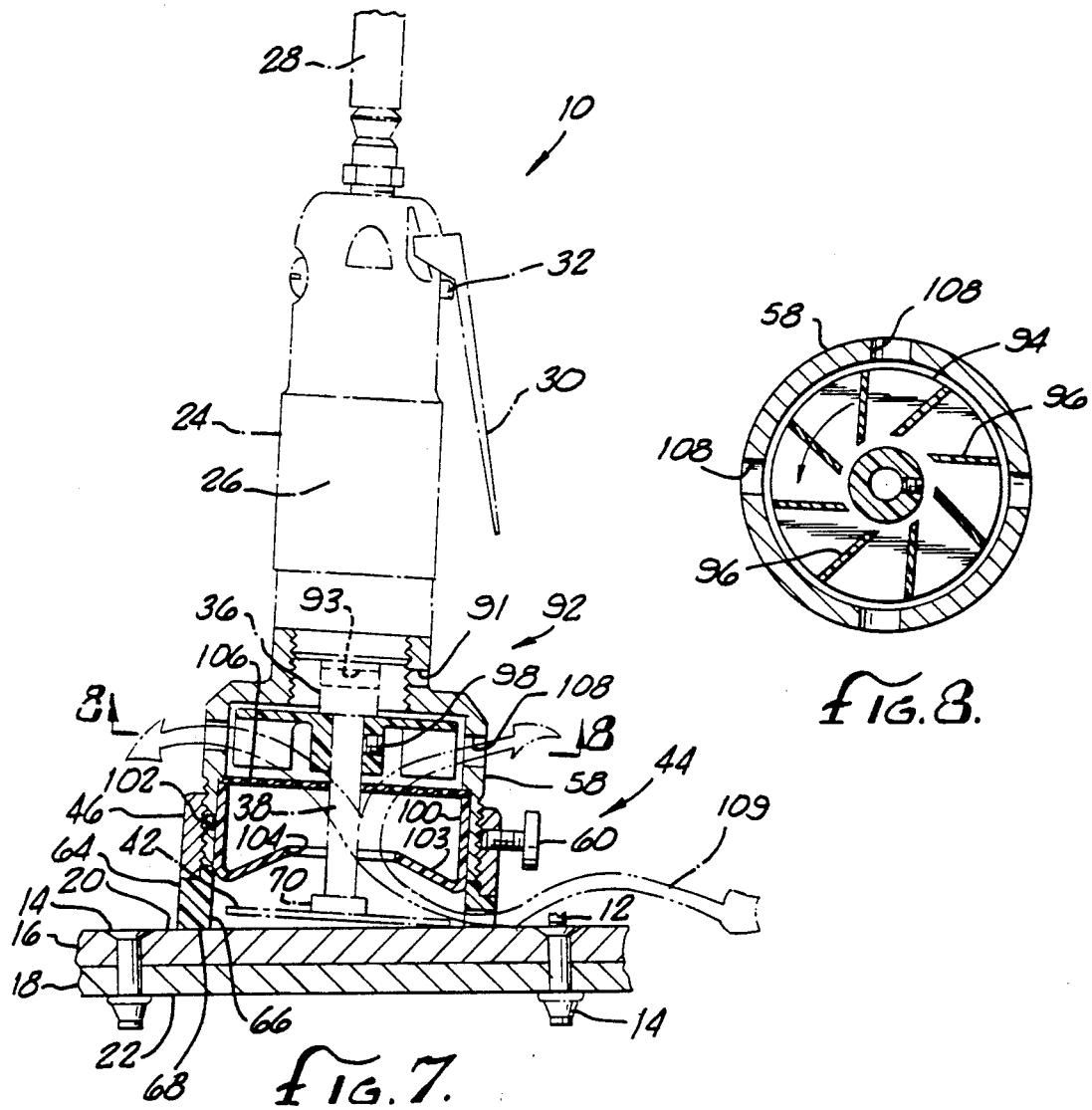

FASTENER PINTAIL SHAVING TOOL

BACKGROUND OF THE INVENTION

This invention relates to cutting tools and, more particularly, to a cutting tool for removing the exposed pintail of an aerospace blind fastener.

Blind fasteners, rivets and similar types of fastening elements commonly are used, for example, in the aerospace industry to connect overlapping structural panels forming part of an aircraft. Examples of one type of well known blind fastener are disclosed in U.S. Pat. No. 3,643,544 and, more recently, in U.S. Pat. No. 4,772,167. In general, these patented fasteners comprise an internally threaded fastener body adapted for insertion into aligned holes in two panels to be joined together, and an externally threaded stem passing in threaded engagement through the fastener body. The inserted or inner end of the stem has an enlarged head, and the outer end of the stem has a wrench engaging portion. An optional drive nut (shown in U.S. Pat. No. 4,772,167) also may be provided on the outer end of the stem for engagement with the outer surface of the fastener body. Upon turning motion of the stem relative to the fastener body, the stem is moved in an axial outward direction through the fastener body. This axial outward movement causes a deformable sleeve on the stem between the stem head and the inner end of the fastener body to deform around the fastener body until it reaches a fully set condition against the inner panel, as is known in the art.

In most cases, the fastener stem also is provided with a localized weakened region or breakgroove adapted to shear the stem along the breakgroove at a predetermined torque, after the deformable sleeve reaches its fully set condition. Ideally, the breakgroove is located axially along the stem such that the stem breaks off in substantially flush relation to the outer end of the fastener body, i.e., the fastener body head. Thus, if the fastener body head is received in a flush, countersunk relation to the surface of the outer panel, the portion of the stem remaining with the set fastener, ideally, also will be flush with the surface of the outer panel. In actual practice, however, the stem may break off approximately one-eight of an inch (i.e., 0.125 inches) above or below the outer surface of the fastener body head, an accepted industry tolerance. If an aerodynamic surface is desired, it becomes necessary to remove any exposed or protruding outer portion of any stem, this protruding portion being commonly referred to as a "pintail". According to present aerospace industry standards, the pintail may not protrude from the outer surface of the fastener body head by more than 0.006–0.008 inches. If it does, then it must be milled down or shaved to an acceptable level. Otherwise, the exposed pintails, which could number in the thousands per aircraft, would create too much turbulence and drag and adversely affect the aircraft's performance.

Over the years, various tools have been designed and employed to remove fastener pintails to achieve a flush aerodynamic panel surface. One such tool comprises a hand-held tool with a cylindrical cutter, usually made of carbide, positioned at the end of the tool. The cutter has helical cutting grooves or flutes on the outer circumferential surface of the cutter. The tool rotates the cutter in two rotational directions at the same time, i.e., around the cylindrical axis of the cutter and around an axis that is transverse or perpendicular to the cylindrical axis. This dual rotation of the tool cutter is designed to enable the operator to manually position the end of the tool over the pintail so that the rotating cutter can shave off the pintail without leaving any high spots or so-called "dead center points".

While the tool described above has been used for years for its intended purpose of removing pintails of set fasteners, there are several recognized disadvantages and drawbacks resulting from its use. For example, from the operator's standpoint, the tool is relatively heavy (weighing in some instances as much as 5-½ pounds), and it is cumbersome to use. The tool also tends to shake and vibrate during use due to the fluted/-helical nature of the cutting grooves of the cylindrical cutter, which makes the tool prone to "dancing" on the pintail during cutting. Another operator drawback is that it usually takes about one minute to remove each pintail, depending on the height and diameter of the pintail, and the operator must apply significant force during the entire time to prevent such dancing. As a result, many operators have suffered hand and wrist injuries requiring medical treatment necessitating absence from work.

The tool discussed above also has several disadvantages from an economic standpoint. Perhaps the most significant drawback is tool maintenance. For example, the cylindrical cutter of the tool can shave off anywhere between 300–1,000 pintails, depending on the hardness of the material comprising the pintail. In a typical high volume aerospace assembly operation, it would not be unusual to shave off 1,000 pintails per tool per day. Thus, it may be necessary in the worst case to change the tool's cutter up to three times per day. Since it generally takes about 20–30 minutes to change a cutter, significant time is consumed, and down time will result unless a replacement tool is available. Significant expense also is involved, since each cutter presently costs about $300 (and each tool presently costs about $3,000). If many tools are used, the cost is multiplied even further. Yet another disadvantage is the marring and gouging of the panel surface that occurs if the cutter dances completely off the pintail during cutting. Not only is the damage unsightly, but costly repair of the surface often is necessary, especially if the damage occurs on a wing or tail section of the aircraft. While tool stabilizers have been developed to attempt to inhibit the undesirable dancing of the tool, they are relatively bulky and add further weight to the tool. Moreover, stabilizers may not be used in tight or difficult-to-access areas, since they are relatively large.

There also presently is no effective means for recovering the fragments of the pintail that are removed by known tools. This results in a messy work area and requires frequent clean up. More significant, however, is the fact that any metal scrap or debris left inside an airframe structure after it is closed up (i.e., fully assembled) can cause severe damage. Also, debris left on the surface of the wing or tail sections of the aircraft can be stepped on while working in this area and cause scratches and other damage to these skin surfaces.

Accordingly, there has existed a definite need for an effective and economical tool adapted to quickly remove the exposed pintail of a fastener without vibration. There further has existed a definite need for such a tool which also recovers the pintail and related debris resulting from the pintail cutting process. The present invention satisfies these needs and provides further related advantages.

SUMMARY OF THE INVENTION

The present invention comprises a tool for removing the protruding pintail of a set fastener, such as a blind fastener of the type commonly used in the aerospace industry. The tool includes a tool housing, an air motor connected to the housing for rotating an output shaft, and a substantially planar cutting disk mounted on the output shaft. Upon rotation of the output shaft, the cutting disk, which is made of a highly abrasive material, cuts through the fastener pintail in a matter of seconds. Moreover, the tool accurately accomplishes its cutting function with virtually no vibration and without marring or scratching the surface in which the fastener is set.

In one embodiment of the invention, an adjustment mechanism is provided at the lower end of the tool for adjusting the distance between the cutting disk and the surface surrounding the fastener, which normally is a relatively planar panel surface. The adjustment mechanism comprises a cylindrical shroud having an open end surrounding the cutting disk, and a threaded sleeve opposite the open end for threaded engagement with a collar on the tool. Rotation of the shroud with respect to the collar causes axial movement of the shroud, which moves the disk closer to or away from the panel surface. This adjustment capability allows the operator to position the disk as close as possible to the panel surface and thereby remove the pintail in a substantially flush manner without scratching the surface during the shaving process. The configuration of the shroud also is such that it tilts the cutting disk with respect to the panel surface. This creates a relief angle between the cutting disk and the panel surface and facilitates the cutting process.

Two different ways are disclosed for mounting the cutting disk to an arbor on the output shaft of the tool. In the first way, the arbor has an enlarged head with a countersunk, threaded hole in axial alignment with the output shaft. The disk also includes a central portion that is deformed or countersunk to match the countersunk bore in the arbor. A threaded fastener with an outwardly tapered head is threadably received in the arbor hole and countersunk central portion on the cutting disk to thereby connect the disk to the arbor in a substantially flush manner. In the second way, the enlarged head of the arbor has a plurality of protrusions or drive lugs extending from it which are adapted to be received in matching holes in the cutting disk. An adhesive is interposed between the contacting surfaces of the arbor and the cutting disk to releasably connect them together.

The tool of this invention provides several important advantages, in addition to those noted above. For example, the cutting disk can remove the exposed pintail in a matter of 2-3 seconds without marring or scratching the panel surface. The tool also is very lightweight and compact. This reduces the likelihood of operator fatigue from prolonged use of the tool and, furthermore, enables the operator to remove pintails from hard-to-access areas. Moreover, the operator need only apply a modest amount of force to the tool, in the range of 2 pounds, to push the cutting disk through the pintail in a saw-like manner. Since there is no tool vibration, hand and wrist injuries to the operator are significantly reduced, if not eliminated. A further advantage of the tool is the low cost of the cutting disks, which can be replaced in about 15 seconds by the operator. Thus, operator down time and tool maintenance costs are kept at a minimum.

In another embodiment of the invention, a vacuum system is provided for collecting the severed pintail and related debris caused by the pintail cutting process. The vacuum system comprises an impeller connected to the output shaft at a lower end of the tool adjacent to the cutting disk. A collection cup surrounding the output shaft is connected to the tool between the impeller and the cutting disk. Upon rotation of the output shaft, the impeller creates a partial vacuum in the collection cup causing air to flow from the outside of the tool to the inside of the tool. A filter interposed between the impeller and the collection cup retains the pintail and related debris within the cup. The vacuum system advantageously prevents the severed pintails and pintail debris from being scattered around the work area where it may present a safety hazard or be stepped on and cause damage to the aircraft panel surfaces. It also reduces maintenance costs.

Other features and advantages of the present invention will become apparent from the following detailed description, taken in conjunction with the accompanying drawings, which illustrate, by way of example, the principles of the invention.

BRIEF DESCRIPTION OF THE DRAWINGS

The accompanying drawings illustrate the invention. In such drawings:

FIG. 3 is an assembly view, partly in cross-section, showing the manner in which the tool's cutting disk may be connected to the tool's output shaft by a fastener;

FIG. 4 is a bottom plan view of the cutting disk assembly shown in FIG. 3;

FIG. 5 is an assembly view, partly in cross-section, showing the manner in which the tool's cutting disk may be connected to the tool's output shaft by an adhesive;

FIG. 6 is a bottom plan view of the cutting disk assembly shown in FIG. 5;

FIG. 7 is a cross-sectional elevational view of a second embodiment of the tool showing a vacuum system designed to collect the shaved-off pintail and related debris; and FIG. 8 is a cross-sectional view, taken substantially along line 8—8 of FIG. 7, showing an impeller mechanism in the tool's vacuum system.

DETAILED DESCRIPTION OF THE PREFERRED EMBODIMENTS

Figures 1, 2:
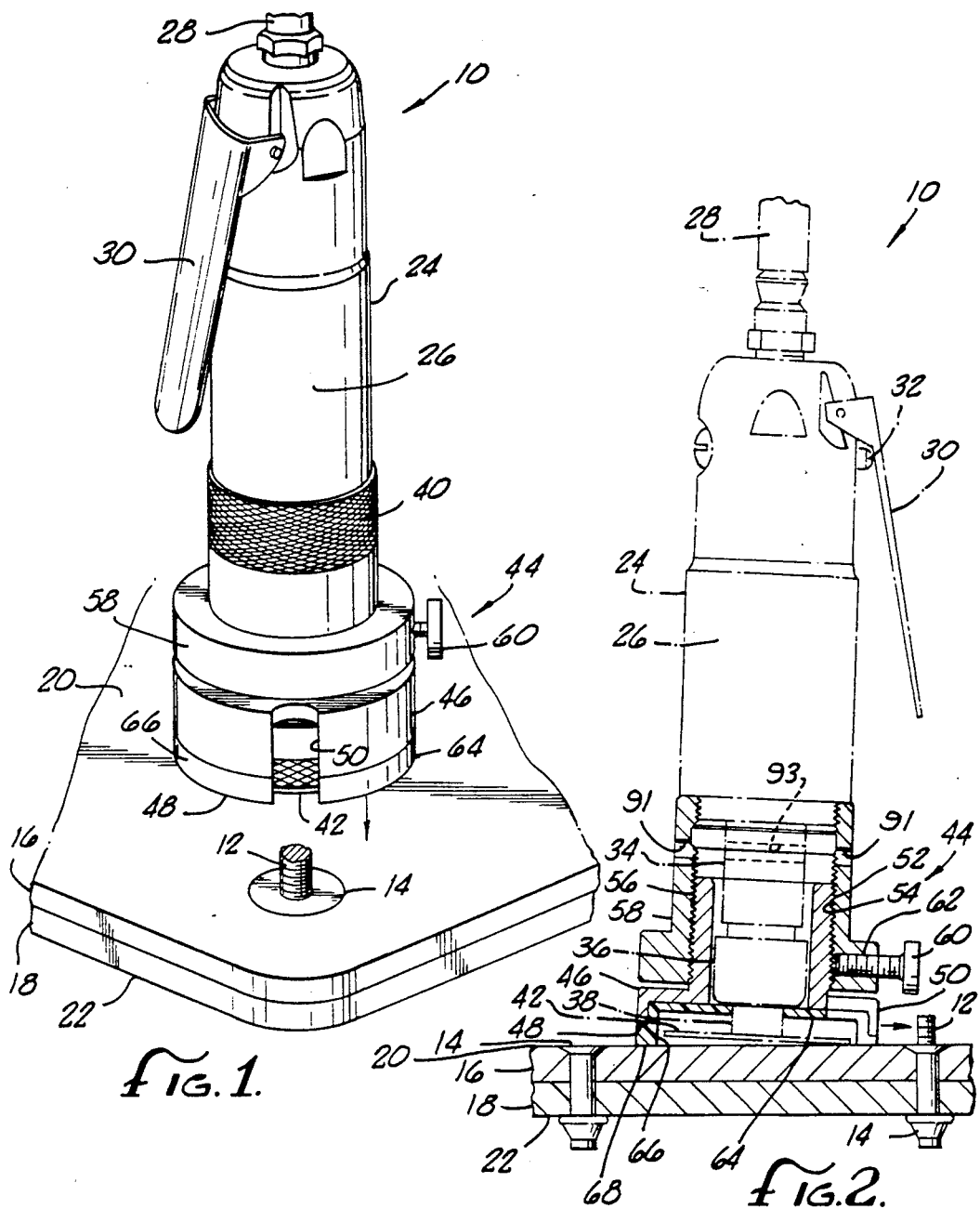
FIG. 1 is a perspective view of a fastener pintail shaving tool embodying the novel features of the invention.
FIG. 2 is a cross-sectional elevational view of the tool showing the tool in position to shave off the exposed pintail of a set fastener joining two overlapping panels.

The present invention is embodied in a shaving tool, generally referred to by the reference numeral 10, for removing the protruding pintail of a set fastener. The tool includes a high-speed cutting disk for quickly and effectively removing the pintail without vibration or damage to the panel surface surrounding the fastener. A novel vacuum system inside the tool also is provided for capturing the severed pintail and any metal debris resulting from the shaving process. The tool of this invention furthermore is intended to be relatively inexpensive to manufacture and maintain, convenient to use, and reliable in operation.

Referring to FIG. 1, the tool 10 is shown in a position ready to shave off the exposed pintail 12 of a fastener 14 set in two overlapping panels 16 and 18. The fastener 14 is illustrated as a blind fastener, but it is understood that other types of fasteners may be used to connect the panels 16 and 18, in which an exposed pintail 12 requires removal. For purposes of reference, the upper panel 16 upon which the tool 10 rests shall be referred to as the outer panel, and the lower panel 18 on the other side of the tool shall be referred to as the inner panel. Also for purposes of reference, the outer panel 16 has an outer surface 20, and the inner panel 18 has an outer surface 22 (FIG. 2).

As shown in both FIGS. 1-2, the tool 10 comprises a cylindrical tool housing 24 having an air motor 26 operated by a source of pressurized air (not shown) connected to an inlet 28 at the top of the tool 10. The air motor 26 is actuated by a lever 30 which depresses a button 32 that regulates air flow to the motor. Thus, the maximum amount of air flow occurs when the button 32 is fully depressed, but a smaller air flow can be achieved by appropriate manipulation of the lever 30. The air motor 26 rotates an output shaft 34 at the lower end of the tool 10, which has a collet 36 at its outer end adapted to receive and rotate a disk mounting arbor 38. In the preferred embodiment, the air motor 26 is adapted to rotate the shaft 34 at approximately 30,000 to 40,000 rpm. Since the tool 10 is of the hand-held type, a band of knurling 40 is provided below the lever 30 to improve the operator's grasp of the tool during the cutting process and facilitate general handling of the tool.

In accordance with the present invention, the tool 10 is provided with a cutting disk 42 connected to the arbor 38 at the outer end of the shaft 34. The disk 42 is circular in shape and relatively thin (approximately 0.046 inches thick in the preferred embodiment), and is constructed from a highly abrasive material. Also, in the preferred embodiment, the disk 42 is made of a composition comprising carborundum and fiberglass. The fiberglass functions as a reinforcer to prevent the disk 42 from fragmenting at high rotational speeds and during use and operation of the tool 10. Such disks 42 are commercially available items sold, for example, by Norton Company of Worcester, Massachusetts, at a cost presently between 25 to 65 cents, the exact price depending on the quantity being purchased. Other suitable abrasive materials, such as silicon carbide, may be used to construct the cutting disk 42. As described in more detail below, the tool 10 equipped with this cutting disk 42 can completely remove most pintails 12 in a matter of 2-3 seconds, with little force being applied by the operator. Moreover, the tool 10 accurately accomplishes its cutting or shaving function with virtually no vibration and without marring or scratching the panel's outer surface 20.

An adjustment mechanism 44 is provided at the lower end of the tool 10 for adjusting the distance between the cutting disk 42 and the outer panel surface 20. The adjustment mechanism 44 comprises a cylindrical shroud 46 surrounding the cutting disk 42 having an open lower end 48 that is larger in diameter than the diameter of the cutting disk. The shroud 46 includes a small access slot 50 to allow the pintail 12 to pass through the shroud and enable the cutting disk 42 to shave off the pintail. The shroud 46 also has a smaller diameter sleeve 52 with external threads 54. These external threads 54 are adapted to threadably engage internal threads 56 provided on a collar 58 at the lower end of the tool 10. Thus, manual rotation of the shroud 46 with respect to the collar 58 causes axial movement of the shroud with respect to the disk 42. This adjustment capability allows the operator to selectively adjust the distance between the cutting disk 42 and the panel surface 20, to thereby shave off the pintail 12 in a substantially flush manner without scratching the panel surface during the shaving process. The internal threads 56 of the collar 58 and external threads 54 of the shroud 46 preferably are sized so that fine axial adjustments (i.e., increments of about 0.0005 inches) can be made. Additionally, an optional scale (not shown) may be provided on the exterior surfaces of the shroud 46 and collar 58 to indicate the position of the disk 42 and the amount of axial movement caused by rotation of the shroud. A thumbscrew 60 extending through a threaded bore 62 in the collar 58 may be loosened or tightened to, respectively, permit or prevent rotation of the shroud 46.

As shown in FIG. 2, the plane defined by the open end 48 of the shroud 46 (where it contacts the panel surface 20) is not precisely perpendicular to the axis of the output shaft 34 of the tool 10, but instead is slightly offset from that axis. This causes the cutting disk 42 to be tilted at a slight relief angle with respect to the outer surface of the outer panel 16. This angled position facilitates cutting of the pintail 12 and allows the disk 42 to come as close as possible to the outer surface 20 without contacting it. Thus, as the tool 10 is moved over the pintail 12, the disk 42 shaves it off as close as possible to the panel's outer surface 20, without dragging over it. Even if some contact does occur, an adjustment can be made, as described above, to eliminate it. In any event, due to the tilted nature of the disk 42, any slight contact that does occur normally will be confined to the relatively small portion of the rotating disk 42 that is closest to the panel outer surface 20, rather than having the entire planar surface of the disk contacting the panel surface. To further reduce the possibility of the tool 10 scratching the panel surface 20, the shroud 46 may be lined with a nylon insert 64 having an enlarged footing 66 with a smooth flat surface 68 for contacting the panel outer surface. It is understood that other soft durable materials besides nylon may be used to make the insert 64. The smooth flat surface 68 of the insert 64 facilitates gliding of the tool 10 across the panel surface 20 during cutting of the pintail 12.

As noted above, the tool 10 of this invention, when equipped with the high-speed cutting disk 42, can completely remove most pintails 12 in a matter of 2-3 seconds. Of course, the cutting time depends upon the composition of the pintail 12. However, for a common 5/32 inch diameter pintail made of steel, such as A-286, H11 or 8740, a shaving time of 2-3 seconds is typical. In addition to cutting speed, another important advantage of the tool 10 is that it accurately accomplishes its cutting function with little effort and virtually no vibration, because the cutting disk 42 is an abrasive saw with no teeth, unlike conventional metal saws. For example, application of only about two pounds of force by the operator will move the disk 42 through the pintail 12 to remove it. Since there is no vibration, damage to the operator's hand and wrist is substantially reduced, if not eliminated completely. Moreover, the disk 42 does not "dance" on the pintail 12 or the panel surface 20, thereby eliminating unnecessary scratching and damage.

Other significant advantages of the tool 10 include its lightweight and compact character. For example, the tool 10 illustrated in FIGS. 1-2 is approximately 1.5 pounds in weight, 5.75 inches long and 1.875 inches in diameter. Since the tool 10 is lightweight and does not vibrate during operation, operator fatigue is not a problem even when there are numerous pintails 12 to be cut. The tool 10 can be held with only a couple of fingers and is easy to manipulate. The lightweight and compact nature of the tool 10 also enables the shaving of pintails 12 in hard-to-access places. Yet another advantage of the tool is that the cutting disk 42 normally is capable of shaving approximately 300 pintails before it requires replacement. Since the disks 42 are relatively inexpensive, as noted above, the cost of cutting each pintail is less than one penny.

Referring now to FIGS. 3-6, two different ways are illustrated for mounting the cutting disk 42 to the arbor 38 on the output shaft 34 of the tool 10. In the first disk embodiment, shown in FIGS. 3-4, the arbor 38 has an enlarged head 70 with an internally threaded bore 72 axially aligned with the output shaft 34. The outer end of the bore 72 has a countersink 74 adapted to receive the central portion 76 of the cutting disk 42, which has been pre-deformed to fit within the countersink. The central portion 76 of the cutting disk 42 also has a hole 78 for receiving the threaded shank 80 of a flat head screw 82. The underside of the screw head 84 is tapered and fits within the deformed central portion 76 of the cutting disk 42. As a result of this structure, when the cutting disk 42 is connected to the arbor 38 by the flat head screw 82, the screw head 84 assumes a substantially flush relationship to the cutting disk. In this way, no protrusions are presented which could scratch or marr the panel surface 20 adjacent to the pintail 1 during cutting.

In the second disk embodiment, shown in FIGS. 5-6, the outer surface of the enlarged head 70 of the arbor 38 that abuts against the cutting disk 42 has a plurality of protrusions or cylindrical drive lugs 86. The drive lugs 86 extend from the arbor surface a distance substantially equal to the thickness of the cutting disk 42. The cutting disk 42 also has a plurality of holes 88 having a size and pattern adapted to receive the corresponding drive lugs 86 on the arbor. It will be appreciated that the size, pattern and configuration of the drive lugs 86 and matching holes 88 in the disk 42 may be varied as desired. The disk 42 is connected to the arbor 38 by an adhesive 90 applied to the cutting disk 42 in the area where it abuts the arbor 38. The adhesive 90 preferably is a pressure sensitive adhesive that adheres the disk 42 to the arbor 38 upon application of pressure to the disk. Suitable pressure sensitive adhesives are available from Minnesota, Mining and Manufacturing Company of St. Paul, Minnesota. Other types of adhesive may be used, in which the disk 42 will be releasably but securely connected to the arbor 38. During rotation of the output shaft 34, and especially during the pintail cutting process, the drive lugs 86 ensure that the cutting disk 42 will be driven rotationally by the arbor 38 and not slip during the pintail cutting process, while the adhesive 90 prevents the disk from flying off in the axial direction.

In both of the disk embodiments discussed above in connection with FIGS. 3-6, the operator can rapidly remove a worn out cutting disk 42 and replace it with a new one. In actual practice, the disk replacement procedure takes only about 15 seconds. For example, in the first disk embodiment of FIGS. 3-4, a common flat blade screwdriver will remove the screw 82. To prevent rotation of the output shaft 34 during removal of the screw 82, a pin (not shown) may be inserted through a side hole 91 and into a transverse hole 93 in the output shaft 34 (FIG. 2). The worn out disk 42 can be quickly removed and a new one placed on the arbor 38 so that the depressed center portion 76 of the disk fits within the countersink 74, thereby automatically aligning the disk hole 78 with the threaded arbor bore 72. After this, it only takes a few seconds to resecure the screw 82 with the screwdriver. The second disk embodiment shown in FIGS. 5-6 is even simpler. The operator only needs to pry the cutting disk 42 from the arbor 38. After checking to be sure that the arbor surface is free of any adhesive 90 that may have remained, a new disk 42 may be conveniently placed on the arbor 38, with the holes 88 in the disk aligned with the drive lugs 86 on the arbor. It is contemplated that the adhesive 90 will be applied to the disk 42 at its place of manufacture and covered with a thin plastic cover sheath (not shown), which may be peeled back to expose the adhesive.

FIGS. 7-8 illustrate another embodiment of the tool 10 which includes a novel vacuum system 92 inside the tool for capturing the severed pintail 12 and any metal debris resulting from the shaving process. In this embodiment, the collar 58 of the tool 10 is diametrically enlarged to receive a vacuum impeller 94 having a plurality of impeller blades 96. The impeller 94, which is shown in horizontal cross-section in FIG. 8, is secured to the disk mounting arbor 38 by a set screw 98. A debris collection cup 100 is mounted within the collar 58 between the impeller 94 and the cutting disk 42, with the cup being connected to the collar by another set screw 102. The collection cup 100 has an upwardly projecting conical bottom wall 103 with a central opening 104 that surrounds the disk mounting arbor 38. It is noted that in this embodiment, the shroud 46 is internally threaded and is axially adjustable with respect to the externally threaded collar 58. Thus, this embodiment is somewhat structurally, but not functionally, different from the adjustment mechanism 44 disclosed in the embodiment of FIGS. 1-2, discussed above.

During operation of the tool 10, the vacuum impeller 94, which is fixed to the disk mounting arbor 38, rotates with the cutting disk 42. As the impeller 94 rotates, the blades 96 comprising the impeller create a partial vacuum in the chamber defined by the debris collection cup 100. This causes air to flow through the access slot 50 in the shroud 46 and into the collection cup 100 through the cup opening 104, where it passes through a filter 106 and exists through exhaust holes 108 provided in the collar 58 in the region of the impeller 94. The arrows designated by the reference numeral 109 illustrate this air flow pattern. The filter 106 is positioned between the impeller 94 and the collection cup 100 and may comprise a screen or other suitable filtering device. During shaving of pintails 12, the severed pintails and other metal debris resulting from the shaving process collect on the filter 106 when the tool 10 is in use. When the tool 10 is shut-off, however, the vacuum is removed and the pintails 12 and debris drop into the bottom of the collection cup 100.

To remove the collection cup 100 and empty the pintails 12 and metal debris, the thumbscrew 60 is loosened so that the shroud 46 and insert 64 may be unthreaded and removed from the collar 58. The cutting disk 42 is then removed, and the set screw 102 which holds the debris collection cup 100 is loosened. This allows the cup 100 to be removed, along with the filter 106, so the cup can be easily emptied and cleaned.

The vacuum system 92 shown in FIGS. 7-8 provides several advantages. Because the tool 10 is capable of vacuuming up and retaining the pintails 12 and metal debris resulting from the pintail cutting process, the work are is kept much cleaner, thereby reducing maintenance and clean-up costs, and the likelihood of any pintails or metal debris remaining in the work area will be substantially reduced. This is especially important when pintails 12 are shaved from the surfaces of the wing and tail sections of an aircraft. By vacuuming up the pintails 12 and debris, the likelihood that these objects will be stepped on and cause scratches and other damage to the wing and tail skin surfaces is substantially reduced. The vacuum feature of this tool 10 also is very desirable in that any metal scrap or debris left in an airframe structure after it is closed up can cause significant damage. The vacuum system 92 of the tool 10 helps eliminate these problems.

It will be appreciated from the foregoing that the present invention provides a tool 10 having a high-speed cutting disk 42 for quickly and effectively removing fastener pintails 12 without vibration or damage to the panel surface 20 surrounding the fastener 14. During the cutting process, a novel vacuum system 92 inside the tool 10 captures the severed pintail 12 and any metal debris resulting from the shaving process. This reduces maintenance costs and provides other desirable advantages.

While a particular form of the invention has been illustrated and described, it will be apparent that various modifications can be made without departing from the spirit and scope of the invention. Accordingly, it is not intended that the invention be limited, except as by the appended claims.

I claim:

1. A tool for removing the protruding pintail of a fastener set in a workpiece, comprising:
   (a) a tool housing;
   (b) motor means connected to the tool housing for rotating an output shaft;
   (c) a substantially planar cutting disk mounted on the output shaft for rotation therewith, the cutting disk being spaced from the workpiece and made of a highly abrasive material adapted to cut through the material comprising the fastener pintail in a saw-like manner without grinding or sanding it down; and
   (d) means for operating the motor means to rotate the cutting disk and cut off the fastener pintail.

2. The tool of claim 1, further comprising adjustment means for adjusting the height of the cutting disk with respect to the surface in which the fastener is set.

3. The tool of claim 2, wherein the adjustment means comprises:
   (a) a threaded collar at the lower end of the tool adjacent to the cutting disk; and
   (b) a shroud having an open end surrounding the cutting disk adapted to contact the surface in which the fastener is set, the shroud including a threaded sleeve for threaded engagement with the threaded collar, such that rotation of the shroud with respect to the tool adjusts the distance between the cutting disk and the surface in which the fastener is set.

4. The tool of claim 3, wherein the plane defined by the open end of the shroud is not perpendicular to the axis of the tool, thereby causing the cutting disk to be positioned at a relief angle with respect to the surface in which the fastener is set.

5. The tool of claim 4, further comprising an insert within the shroud for surrounding the cutting disk, the insert including a footing with a smooth surface adapted to contact the surface in which the fastener is set without scratching it.

6. The tool of claim 5, wherein the insert is made of a soft durable material.

7. The tool of claim 6, wherein the soft durable material comprises nylon.

8. The tool of claim 4, further comprising stop means for selectively permitting or preventing relative rotation between the shroud and the collar.

9. The tool of claim 8, wherein the stop means comprises a thumbscrew extending through a threaded bore in the collar for releasable contact with the shroud.

10. The tool of claim 8, wherein the stop means comprises a thumbscrew extending through a threaded bore in the shroud for releasable contact with the collar.

11. The tool of claim 1, wherein the cutting disk is made of a composition comprising carborundum and fiberglass.

12. The tool of claim 1, wherein the cutting disk is made of a composition comprising silicon carbide and fiberglass.

13. The tool of claim 1, wherein the cutting disk is connected to the output shaft by a fastener.

14. The tool of claim 1, wherein the cutting disk is connected to the output shaft by an adhesive.

15. The cutting tool of claim 14, wherein the adhesive is a pressure sensitive adhesive.

16. The tool of claim 1, further comprising:
   (a) an arbor connected to the output shaft for rotation therewith, the arbor having an enlarged head with a countersunk, threaded hole in axial alignment with the output shaft;
   (b) a countersunk central portion on the cutting disk adapted to be received within the countersunk hole in the arbor, the disk further including a hole aligned with the arbor hole; and
   (c) a threaded fastener having an enlarged, outwardly tapered head with a flat outer surface, the fastener being adapted to be threadably received in the threaded arbor hole to connect the disk to the arbor such that the flat outer surface of the fastener head is substantially flush with the cutting disk.

17. The tool of claim 1, further comprising:
   (a) an arbor connected to the output shaft for rotation therewith, the arbor having an enlarged head with a plurality of protrusions extending therefrom;
   (b) a plurality of holes in the cutting disk adapted to mate with the protrusions extending from the arbor; and
   (c) adhesive means between the contacting surfaces of the arbor and the cutting disk for connecting the disk to the arbor.

18. The tool of claim 1, wherein the motor means comprises an air motor mounted in the tool housing.

19. A tool for removing the protruding pintail of a fastener set in a workpiece, comprising:
   (a) a tool housing;
   (b) motor means connected to the tool housing for rotating an output shaft;

(c) a substantially planar cutting disk mounted on the output shaft for rotation therewith, the cutting disk being spaced from the workpiece and made of a highly abrasive material adapted to cut through the fastener pintail in a sawlike manner without grinding or sanding it down;

(d) means for operating the motor means to rotate the cutting disk and cut off the fastener pintail; and (e) vacuum means on the tool for collecting the severed pintail and related debris resulting from the pintail cutting process.

20. The tool of claim 19, wherein the vacuum means comprises:

(a) an impeller connected to the output shaft for rotation therewith at a lower end of the tool adjacent to the cutting disk;

(b) a collection cup surrounding the output shaft and connected to the tool between the impeller and the cutting disk; and (c) a filter interposed between the impeller and the collection cup, whereby rotation of the output shaft rotates the impeller and causes air to flow from the outside of the tool to the inside of the tool, through the collection cup, filter and impeller where it exits the tool through exhaust holes, with the severed pintail and related pintail debris from the cutting process being retained in the collection cup.

21. The tool of claim 19, wherein the vacuum means comprises:

(a) an enlarged collar at a lower end of the tool adjacent to the cutting disk;

(b) an impeller positioned within the collar and connected to the output shaft for rotation therewith, the collar further including a plurality of exhaust holes in radial alignment with the impeller;

(c) a collection cup connected to the collar between the impeller and the cutting disk, the collection cup including an opening surrounding the output shaft; and (d) a filter positioned within the collar between the impeller and the collection cup, whereby rotation of the output shaft rotates the impeller and creates a partial vacuum in the area defined by the collection cup and the filter screen to collect the severed pintail and related pintail debris caused by the cutting process.

22. The tool of claim 21, wherein the impeller is connected to the output shaft by a set screw, and the collection cup is connected to the collar by a set screw.

* * * * *